United States Patent
Cohen et al.

(10) Patent No.: US 9,697,486 B2
(45) Date of Patent: Jul. 4, 2017

(54) FACILITATING PERFORMANCE OF TASKS VIA DISTRIBUTION USING THIRD-PARTY SITES

(75) Inventors: Peter D. Cohen, Seattle, WA (US); Christopher E. Smoak, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 3343 days.

(21) Appl. No.: 11/537,491

(22) Filed: Sep. 29, 2006

(65) Prior Publication Data

US 2008/0082542 A1   Apr. 3, 2008

(51) Int. Cl.
*G06Q 10/00* (2012.01)
*G06Q 10/06* (2012.01)

(52) U.S. Cl.
CPC ....... *G06Q 10/06311* (2013.01); *G06Q 10/00* (2013.01); *G06Q 10/063112* (2013.01); *G06Q 10/06395* (2013.01)

(58) Field of Classification Search
CPC ..... G06Q 10/063112; G06Q 10/06311; G06Q 10/06395
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,112,243 A * | 8/2000 | Downs et al. | 709/226 |
| 6,128,380 A | 10/2000 | Shaffer et al. | 379/265 |

(Continued)

OTHER PUBLICATIONS

U.S. Appl. No. 10/990,771, filed Nov. 16, 2004, Mortensen et al.

(Continued)

*Primary Examiner* — Ivan R Goldberg
(74) *Attorney, Agent, or Firm* — Seed IP Law Group LLP

(57) ABSTRACT

Techniques are described for facilitating performance of tasks by human users. A task exchange server system acts an intermediary to facilitate performance by human task performer users of tasks provided by other task requesters, such as by providing information about tasks via an electronically accessible site. The task exchange server may further cause information about tasks to be provided to at least some users as they interact with third-party sites not provided by the task exchange server, such as third-party sites operated by entities unrelated to the task exchange server's operator. The third-party sites may include information about tasks along with other information that the third-party sites provide to users, or instead a separate client-side program executing on computing devices of certain users may obtain and present information about tasks to the users, such as in conjunction with information provided by unaffiliated third-party sites.

31 Claims, 9 Drawing Sheets

(56) References Cited

U.S. PATENT DOCUMENTS

| | | | |
|---|---|---|---|
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,385,620 B1 | 5/2002 | Kurzius et al. | |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,742,002 B2 | 5/2004 | Arrowood | |
| 6,763,104 B1 | 7/2004 | Judkins et al. | 379/265 |
| 6,859,523 B1 * | 2/2005 | Jilk et al. | 379/32.01 |
| 6,938,048 B1 * | 8/2005 | Jilk et al. | 705/7.14 |
| 7,155,400 B1 * | 12/2006 | Jilk et al. | 705/7.14 |
| 7,197,459 B1 | 3/2007 | Harinarayan et al. | 704/270.1 |
| 7,640,548 B1 * | 12/2009 | Yu et al. | 718/106 |
| 2001/0042000 A1 | 11/2001 | Defoor, Jr. | |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0105884 A1 * | 6/2003 | Upton | 709/318 |
| 2003/0120559 A1 * | 6/2003 | Don | 705/26 |
| 2003/0200156 A1 | 10/2003 | Roseman et al. | 705/27 |
| 2003/0204449 A1 | 10/2003 | Kotas et al. | 705/27 |
| 2004/0205554 A1 * | 10/2004 | Goswami et al. | 715/513 |
| 2005/0229104 A1 | 10/2005 | Franco et al. | |
| 2006/0106675 A1 * | 5/2006 | Cohen et al. | 705/26 |
| 2006/0106774 A1 * | 5/2006 | Cohen et al. | 707/3 |
| 2007/0073610 A1 * | 3/2007 | Marugabandhu et al. | 705/37 |
| 2007/0265092 A1 * | 11/2007 | Betteridge | 463/42 |

OTHER PUBLICATIONS

U.S. Appl. No. 10/990,949, filed Nov. 16, 2004, Cohen et al.
U.S. Appl. No. 10/990,951, filed Nov. 16, 2004, Cohen et al.
U.S. Appl. No. 10/991,339, filed Nov. 16, 2004, Cohen et al.
"About Spending," retrieved Nov. 23, 2004, from http://www.mypoints.com/mp/dstatial.show?isref=nmhp.popup.aboutspending.default, 1 page.
"Earning Points with MyPoints," retrieved Nov. 23, 2004, from http://www.mypoints.com/mp/dstatial.show?isref=nmhp.popup.aboutearning.default, 1 page.
"FAQs," retrieved Nov. 23, 2004, from http://www.mypoints.com/mp/dstatial.show?isref=nmhp.popup.faq.default, 1 page.
"Frequently Asked Questions about the Open Mind Initiative," retrieved Nov. 16, 2004, from http://www.openmind.org/FAQs.html, 3 pages.
"Frequently Asked Questions," TrueDater FAQ's, retrieved Apr. 4, 2005, from http://www.truedater.com/index.php?action=faqs, 2 pages.
"Grid—The Competitive Advantage," Aug. 2004, retrieved Jun. 9, 2005, from http://www.sun.com/solutions/documents/articles/grid_adv_aa.xml?null, 2 pages.
"Join MyPoints Now," retrieved Nov. 23, 2004, from http://www.mypoints.com/?MCK=ccb67d8c41a3819b, 4 pages.
"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, 3 pages.
"The ESP Game," retrieved Jun. 8, 2005, from http://www.espgame.org, 1 page.
"What is BonusMail®?," retrieved Nov. 23, 2004, from http://www.mypoints.com/mp/dstatial.show?isref=nmhp.popup.bonusmail.default, 1 page.
"What is Keen," retrieved Jun. 8, 2005, from http://www.keen.com/documents/homepage/wik_pop.asp?TID=gbFQnFLPstnUuFonMtBmHw, 1 page.
"What is My Points," retrieved Nov. 23, 2004, from http://www.mypoints.com/mp/dstatial.show?isref=nmhp.popup.whatis.default, 1 page.
About, Inc., "Intelligent Agents," retrieved Jun. 9, 2005, from http://psychology.about.com./od/intelligentagents/, 5 pages.
About, Inc., "Our Story," retrieved Jun. 9, 2005, from http://ourstory.about.com/, 2 pages.
About, Inc., Welcome to About.com, retrieved Jun. 9, 2005, from http://www.about.com, 2 pages.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, D., "Hipbone Connects to Kana," Jan. 5, 2004, retrieved Jun. 8, 2005, from http://www.line56.com/print/default.asp?ArticleID=5255, 1 page.
Calishain, T., "Yahoo! Service Offers More Advice than Expertise," May 6, 2002, retrieved Jul. 16, 2004, from http://www.infotoday.com/newsbreaks/nb020506-1.htm, 2 pages.
distributed.net, "distributed.net History & Timeline," retrieved Jun. 8, 2005, from http://www.distributed.net/history.php, 7 pages.
distributed.net, "The Organization," retrieved Jun. 8, 2005, from http://www.distributed.net/, 2 pages.
Doan, A., "MongoMusic Fans Include Microsoft," Sep. 9, 2000, Forbes.com, retrieved Jun. 9, 2005, from http://www.forbes.com/2000/09/09/feat2.html, 3 pages.
DuBaud, S., "Advice Site Resort to Legal Counsel," Jan. 4, 2002, retrieved Apr. 29, 2004, from http://news.com.com/2011-1088-801359.html, 3 pages.
Elance Inc., Elance Online™—Everyday Outsourcing™, retrieved Jun. 9, 2005, from http://www.elance.com/c/static/main/displayhtml.pl?file=eol.html&module=home, 2 pages.
Elance, Inc., "Elance History," retrieved Jun. 8, 2005, from http://ww.elance.com/c/static/main/displayhtml.pl?file=heritage.html, 3 pages.
ELancer homepage, retrieved Jun. 8, 2005, from http://www.elancer.us/, 2 pages.
Epinions, Inc., Epinions.com homepage, retrieved Jun. 9, 2005, from http://www.epinions.com, 2 pages.
Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.
Get a Freelancer.com homepage, retrieved Jun. 8, 2005, from http://www.getafreelancer.com, 3 pages.
gonesilent.com homepage, Aug. 22, 2000, retrieved Jun. 8, 2005, from http://web.archive.org/web/20000822122731/www.gonesilent.com/about.html, 2 pages.
Google—Answers, "Ask a question, Set your Price. Get your Answer.," retrieved Jun. 9, 2005, from http://answers.google.com/answers/, 1 page.
Google, "Your Computer's Idle Time is too Precious to Waste," retrieved Jun. 9, 2005, from http://toolbar.google.com/dc/offerdc.html, 1 page.
Gunn, S., "Hey, buddy, can you spare some cycles?," Sep. 24, 1997, retrieved Jun. 8, 2005, from http://www.cnn.com/TECH/9709/24/netly.news/, 4 pages.
Hagel, J. et al., "Go Slowly with Web Services," Feb. 15, 2002, CIO.com retrieved from http://www.cio.com/archive/021502/keynote.html, 4 pages.
Hagel, J., et al., "Your Next IT Strategy," *Harvard Business Review* RO109G:105-113, Oct. 2001, 11 pages.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, 2 pages.

(56) References Cited

OTHER PUBLICATIONS

Ingenio, Inc., Introducing Ingenio™ Pay Per Call™, retrieved Jun. 8, 2005, from http://www.ingenio.com/documents/corp/home.asp, 2 pages.
Ingenio, Inc., KEEN—Your Personal Advisor, retrieved Jun. 8, 2005, from http://www.keen.com, 2 pages.
Ingenio, Inc., KEEN—Your Personal Advisor/Get Advice, retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp; 2 pages.
Jupitermedia Corportion, jGuru homepage, retrieved Jun. 9, 2005, from http://www.jguru.com, 5 pages.
Kana Inc., "Corporate Overview," retrieved Jun. 8, 2005, from http://www.kana.com/about/about.aspx, 2 pages.
Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.
Kenexa, "Call Centers," retrieved Jun. 8, 2005, from http://www.kenexa.com/ind_callcent.html, 3 pages.
Lynn, R., "Keeping Online Daters Honest," Apr. 1, 2005, retrieved on Apr. 4, 2005, from http://www.wired.com/news/print/0,1294,67083,00.html, 3 pages.
Massive Multiplayer Online Role-Playing Game—homepage, retrieved Jun. 8, 2005, from http://www.mpog.com, 2 pages.
Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.
Mori, G., et al., "Breaking a Visual CAPTCHA," retrieved Jun. 8, 2005, from http://www.cs.berkeley.edu/~mori/gimpy/gimpy.html, 4 pages.
Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.
Multiplayer Online Games Directory—homepage, retrieved Jun. 8, 2005, from http://www.mpogd.com, 1 page.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
Online Multiplayer Games Network—homepage, retrieved Jun. 8, 2005, from http://www.omgn.com, 2 pages.
Project Gutenberg's Distributed Proofreaders—homepage, retrieved Jun. 9, 2005 from http://www.pgdp.net/c/default.php, 4 pages.
Rhodes, B., "The Wearable Remembrance Agent: A System for Augmented Memory," Appeared in *Personal Technologies Journal Special Issue on Wearable Computing* 1:218-224, 1997, retrieved Jun. 9, 2005, from http://www.bradleyrhodes.com/Papers/wear-ra-personaltech/, 10 pages.
Serena Software, Inc., "Serena™ Automating Change," retrieved Jun. 9, 2005, from http://www.serena.com, 1 page.
SETI Institute homepage, retrieved Jun. 9, 2005, from http://www.seti.org/site/pp.asp?c=ktJ2J9MMIsE&b=178025, 3 pages.
Siebel Systems, Inc., Siebel homepage, retrieved Jun. 8, 2005, from http://www.siebel.com/, 3 pages.
Singh, P., "Open Mind: common sense—Teaching computers the stuff we all know," retrieved Jun. 9, 2005, from http://commonsense.media.mit.edu/cgi-bin/search.cgi, 2 pages.
Singh, P., "The Open Mind Common Sense Project," Jan. 2, 2002, retrieved Jun. 9, 2005, from http://www.kurzweilai.net/articles/art0371.html, pp. 1-24, 24 pages.
Spice, B., "CMU Student Taps Brain's Game Skills," Oct. 5, 2003, retrieved Jun. 8, 2005, from http://www.post-gazette.com/pg/03278/228349.stm, 5 pages.
Spogg.com—homepage, retrieved Jun. 8, 2005, from http://www.spogg.com, 2 pages.
Sun Microsystems, Inc., "Products & Technologies—Java Technology," retrieved Jun. 9, 2005, from http://java.sun.com, 2 pages.
Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.
TopCoder, Inc., TopCoder homepage, retrieved Jun. 8, 2005, from http://www.topcoder.com/, 2 pages.
University of California, "What is SETI@home?," retrieved Jun. 9, 2005, from http://setiathome.ssl.berkeley./edu./, 1 page.
Wilson, B. "Anti-Social Software," Apr. 30, 2004, retrieved Aug. 26, 2005, from http://www.brendonwilson.com/profile/000156.shtml, 5 pages.
Wolverton, T., et al., "Yahoo Launches Advice Site," Apr. 29, 2002, CNET News.com, retrieved Apr. 29, 2004, from http://news.com.com/2102-1017_3-894968.html?tag+st.util.print, 2 pages.

\* cited by examiner

FACILITATING PERFORMANCE OF TASKS VIA DISTRIBUTION USING THIRD-PARTY SITES

TECHNICAL FIELD

The following disclosure relates generally to facilitating performance of tasks by task performer users, such as by distributing information regarding tasks via users' interactions with third-party Web sites.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example, it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("extensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, even if humans are willing to perform tasks, various problems exist with using such humans to perform tasks. For example, it may be difficult to identify humans that are willing to perform tasks, and such humans may not be aware that tasks are available to be performed or of how to obtain information about such tasks. In addition, even humans that are aware that information about available tasks may be obtained in various ways may be reluctant to take actions to obtain such task information, or may do so only infrequently.

Thus, it would be beneficial to provide techniques that efficiently and quickly distribute information about tasks to humans, as well as that provide other benefits.

DETAILED DESCRIPTION

Figure 1:
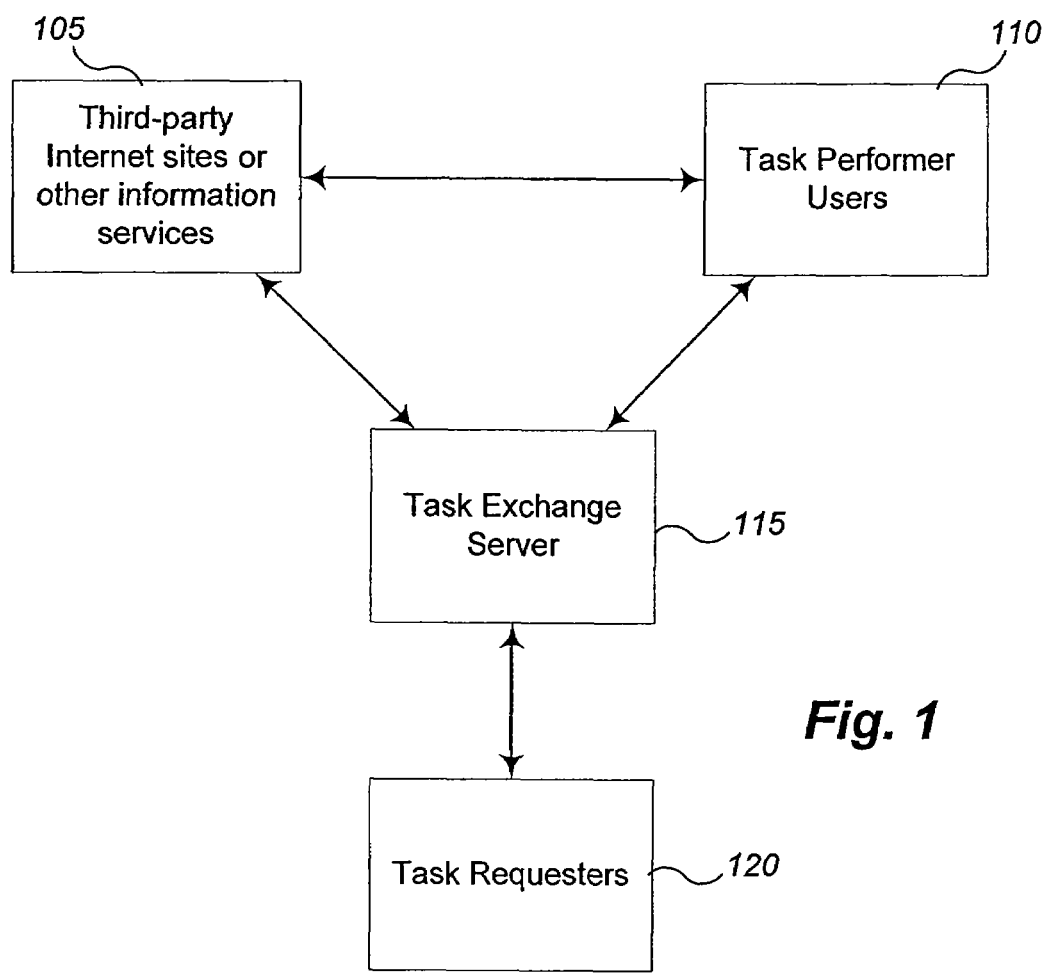
FIG. 1 illustrates examples of various types of interactions to facilitate performance of tasks.

Techniques are described for facilitating performance of tasks by human users. In at least some embodiments, a task exchange server system acts an intermediary to facilitate performance by human task performer users of tasks provided by other task requesters, such as by providing information about tasks to task performer users via a Web site or other electronically accessible site on the Internet or other communications network. In at least some such embodiments, the performance of tasks is further facilitated by the task exchange server by distributing information about available tasks in other ways, such that the task performer users may obtain information about available tasks without directly interacting with the task exchange server. In particular, in some embodiments information about tasks is provided to at least some users as they interact with third-party Web sites or other electronically accessible information services that are not provided by the task exchange server. In this manner, information about tasks may be provided to users by the task exchange server in an efficient manner with minimal action on the part of the users, and information about particular tasks of interest (e.g., tasks to be performed in a short time) may be quickly provided to users who may have interest in performing those tasks.

Information about tasks may be provided to users as they interact with third-party Web sites or other electronically accessible information services (referred to generally as "third-party sites" herein) in various ways in various embodiments. In some embodiments, the third-party sites may be operated by entities unrelated to the operator of the task exchange server, but with the third-party sites being affiliated with the task exchange server such that they have agreed to include information about tasks to users along with other information that the third-party sites provide. Alternatively, the third-party sites may be unaffiliated with the task exchange server and not provide information about tasks to users, but a separate program executing on behalf of certain users may obtain and present information about tasks to the users, such as in conjunction with information provided by the unaffiliated third-party sites. In particular, in some embodiments at least some users (e.g., users that have previously registered with the task exchange server to act as task performer users and perform tasks) are provided with a client-side application to execute on a computing device of the user, such as by the task exchange server. The client-side application may be, for example, an extension application (e.g., an applet, plug-in, executable script, or other extension) designed to interact with one or more types of other host applications (e.g., Web browsers), such as a toolbar extension application that displays a toolbar as part of the user interface of a host Web browser.

As previously noted, in some embodiments, information about available tasks is obtained by some third-party sites and included in Web pages (or other groups of information) provided to users. In such embodiments, the third-party sites may include the task information in Web pages provided to all users, or instead may only provide the task information to users known to be task performer users associated with the task exchange server (e.g., based on information previously provided by the users to the third-party sites and/or based on information previously provided by the task exchange server to the third-party sites). If an identity or other information about a particular user is known to the third-party site, information that is personalized to the user may be included by the third-party in Web pages provided to that user, such as based on selection by the third-party site among task information previously provided by the task exchange server and/or based on the task exchange server providing information to the third-party site that is specific to that user (e.g., based on a dynamic request made to the task exchange server by the third-party site). If task information is provided to all users, the provided information may further include information to assist or enable users that are not yet task performer users to perform the tasks, such as instructions and/or user-selectable controls (e.g., one or more URLs or other links) to allow users to easily register with the task exchange server to act as a task performer user. Furthermore, in some embodiments users may be allowed to perform at least some tasks even if an identity of the user is not known and/or if the user is not yet a task performer user, such as if the user receives compensation or other credit only if the user subsequently identifies himself/herself (e.g., by logging in as an existing task performer user) and/or registers as a task performer user.

In addition, the information included by a third-party site related to tasks may be a reference or other data that causes a user's Web browser and/or client-side extension application to automatically retrieve the actual task information from the task exchange server (or other source) at a time of displaying the information on the user's client system (e.g., via an HTML IMG link). Furthermore, the information about available tasks may be provided to users in various formats, including indications of tasks (e.g., URLs or other links) that a user may select to obtain additional information and/or to perform the tasks, or user-selectable fields or other controls that the user may interact with directly on a displayed Web page to perform a task (e.g., to supply results of performance of the task, such as an answer to a question supplied as part of the task). Third-party sites may also be incentivized to provide information about available tasks in various ways in various embodiments. For example, a third-party site may receive payment for displaying or otherwise providing task information to users and/or based on the successful performance of tasks by users via the third-party site (e.g., to obtain a flat fee per performed task, to obtain a percentage of task compensation earned by users, etc.), such as payment from the task exchange server (or from task requesters that supply the available tasks via the task exchange server and/or from task performer users interacting with the third-party site). Furthermore, if the third-party site has submitted their own tasks, the third-party site may be incentivized to have their own users perform their tasks, such as via monetary incentives (e.g., for a discount of a fee that the task exchange server would otherwise charge the third-party site as a task requester) and/or by obtaining access to task performer users that may be particularly knowledgeable about the third-party site's tasks and/or otherwise appropriate for their tasks. Additional details related to providing of information about tasks by third-party sites are included below.

In addition, in some embodiments, the providing of information about available tasks may be facilitated by a task performance facilitator application (also referred to as a "client-side extension application" or "extension application") executing on a client device used by a user to facilitate performance of tasks by the user. For example, in some embodiments third-party sites may include information about tasks in such a manner that the information is not by default visible and/or selectable by users, but with the extension application (if it is present) being able to identify that information and cause it to be visible and/or selectable as appropriate (e.g., by the third-party site including the information as metadata for the Web page, such as by tagging that information in a manner recognizable to the extension application). Alternatively, the extension application may directly obtain task information from the task exchange server (or other external source), whether or not prompted by the information supplied by a third-party site. For example, the extension application may retrieve information about tasks based on the information supplied by the third-party site (e.g., to request task information that is similar to or otherwise related to the content of the supplied information, such as based on text analysis of the supplied information; to request task information based on the third-party site, including tasks previously supplied by or otherwise associated with the third-party site; etc.). Furthermore, in some embodiments the extension application may further obtain and provide other types of information to a user, such as information about a task performer user's account with the task exchange server and/or about prior performance of tasks by the user via the task exchange server. The task information and/or other information obtained by the client-side extension application may be provided to the user in various ways (e.g., by incorporating the information as part of one or more Web pages being displayed; by displaying the information in a toolbar or other part of the Web browser user interface that is separate from the displayed Web pages, such as via a separate frame or tab; etc.). Furthermore, a particular client-side extension application may be configured to obtain and use preference and other information specific to a user on whose client device the extension application is executing (e.g., information obtained from the user via the client device, from the task exchange server based on an obtained identity of the user, etc.), including related to types of tasks in which the user is interested, preferred manners for receiving task information (e.g., at certain times, based on certain third-party sites, etc.), etc. Additional details related to operation of a client-side extension application are included below.

FIG. 1 illustrates examples of various types of interactions to facilitate performance of tasks. In this example, a task exchange server 115 interacts with task requesters 120 to obtain information about tasks that are available to be performed, and with task performer users 110 to facilitate performance of the tasks by the task performer users (e.g., via a Web site provided by the task exchange server, not shown). In addition, the task exchange server interacts with various third-party Internet sites or other third-party information service sites 105 to provide task information to task performer users based on interactions of the task performer users with the third-party sites. Various messages (or other electronic communications) may occur between the illustrated parties, including the following: messages between the task requesters and the task exchange server as part of the task requesters submitting one or more tasks for performance by the task performer users and receiving results for those tasks; messages between the task exchanger server and task performer users to allow the task performer users to identify available tasks and supply results for those tasks; messages between the task exchange server and third-party sites for the task exchange server to provide information about available tasks and in some embodiments to obtain results for those tasks; and messages between third-party sites and task performer users as part of the task performer users requesting information from the third-party sites that is not about tasks available to be performed and receiving the requested information along with information about available tasks. Although not shown, the various parties may interact with other users and sites that are not shown. For example, the task exchange server may interact with other services (e.g., a payment processing service) while facilitating the performance of available tasks. As a second example, the third-party sites may interact with other users who are not task performer users. Also, while not illustrated here, in some embodiments task requesters and third-party sites may directly interact in certain situations, such as to allow task requesters to directly supply task information to the third-party sites that the third-party sites will then provide to the task performer users 110 or other task performer users, or for third-party sites to send task performance results to the task requesters and/or to re-direct questions or other communications from task performer users to the task requesters. In addition, although the various parties are illustrated as being distinct in this example, in some embodiments a party may serve multiple roles, such as the same entity being a task requester and a third-party site, or a particular person acting as both a task requester and a task performer user (e.g., for different tasks). Moreover, there may be multiple task performer users, task requesters, and third-party sites. Additional details related to an example task fulfillment facilitator system that may act as a task exchange server are included in pending commonly-owned U.S. patent application Ser. No. 10/990,949, filed Nov. 16, 2004 and entitled "Providing An Electronic Marketplace To Facilitate Human Performance Of Programmatically Submitted Tasks," which is hereby incorporated by reference.

For illustrative purposes, some embodiments are described below in which specific types of interactions occur between specific examples of a task exchange server, third-party sites, users, and a client-side extension in order to facilitate performance of specific types of tasks. However, those skilled in the art will appreciate that the techniques may be used in a wide variety of other situations, including with other types of tasks, parties and interactions, and that the invention is not limited to the exemplary details provided.

Figure 2A:
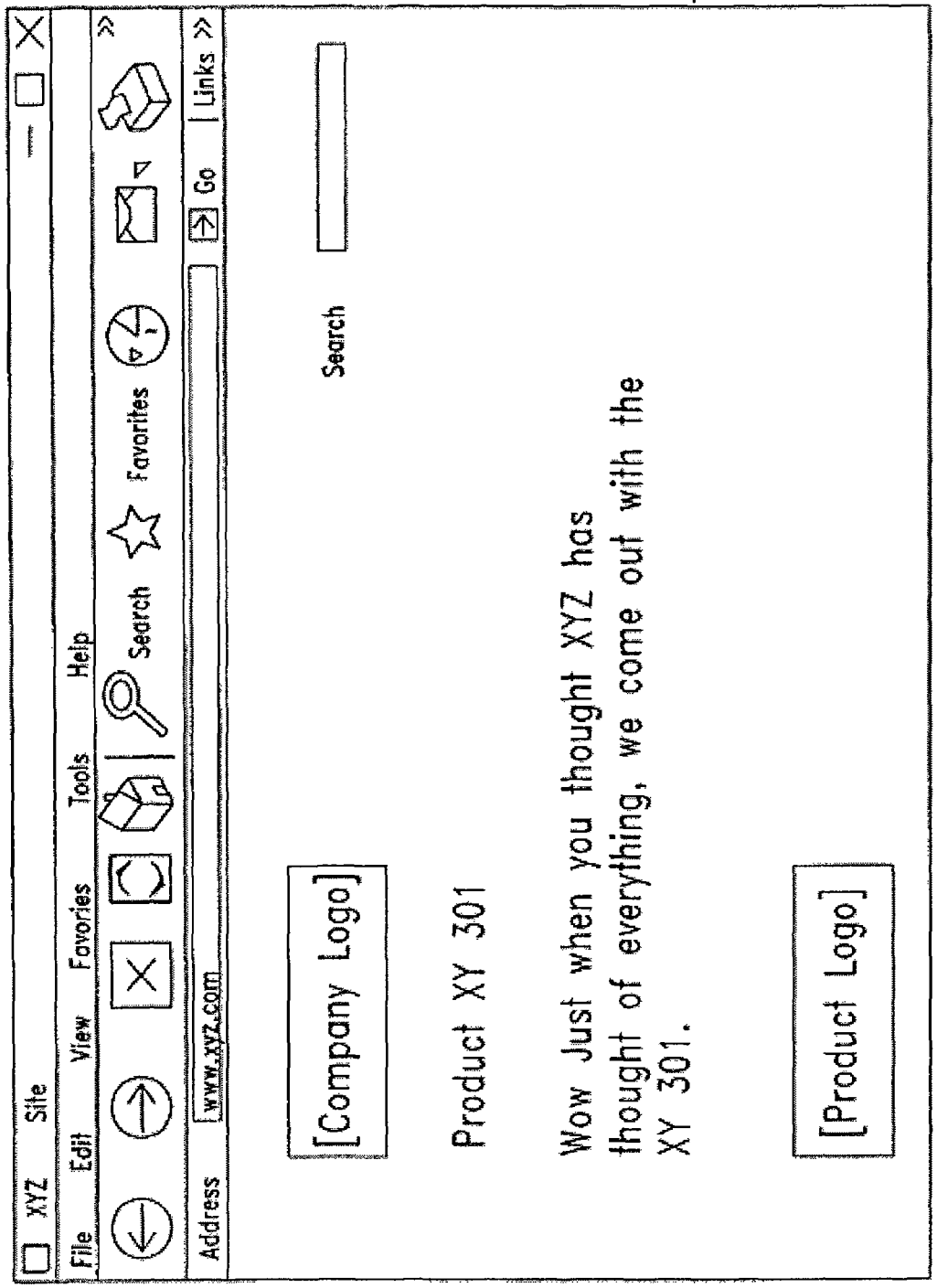
FIGS. 2A-2D illustrate example user interactions with third-party sites to facilitate providing task information to the users.

FIGS. 2A-2D illustrate example user interactions with third-party sites to facilitate task performance. In particular, FIG. 2A illustrates an example Web page displayed in a Web browser user interface 205, with the Web page in this example being obtained by a user from a third-party Internet Web site. In this example, a client-side extension application is not in use, and the third-party site has not provided any visible information about available tasks. The third-party Internet site may, however, have provided task information along with the Web page that is not currently displayed, such as client-side executable code or XML elements that are inserted in the source information used by the Web browser to render the Web page.

Figure 2B:
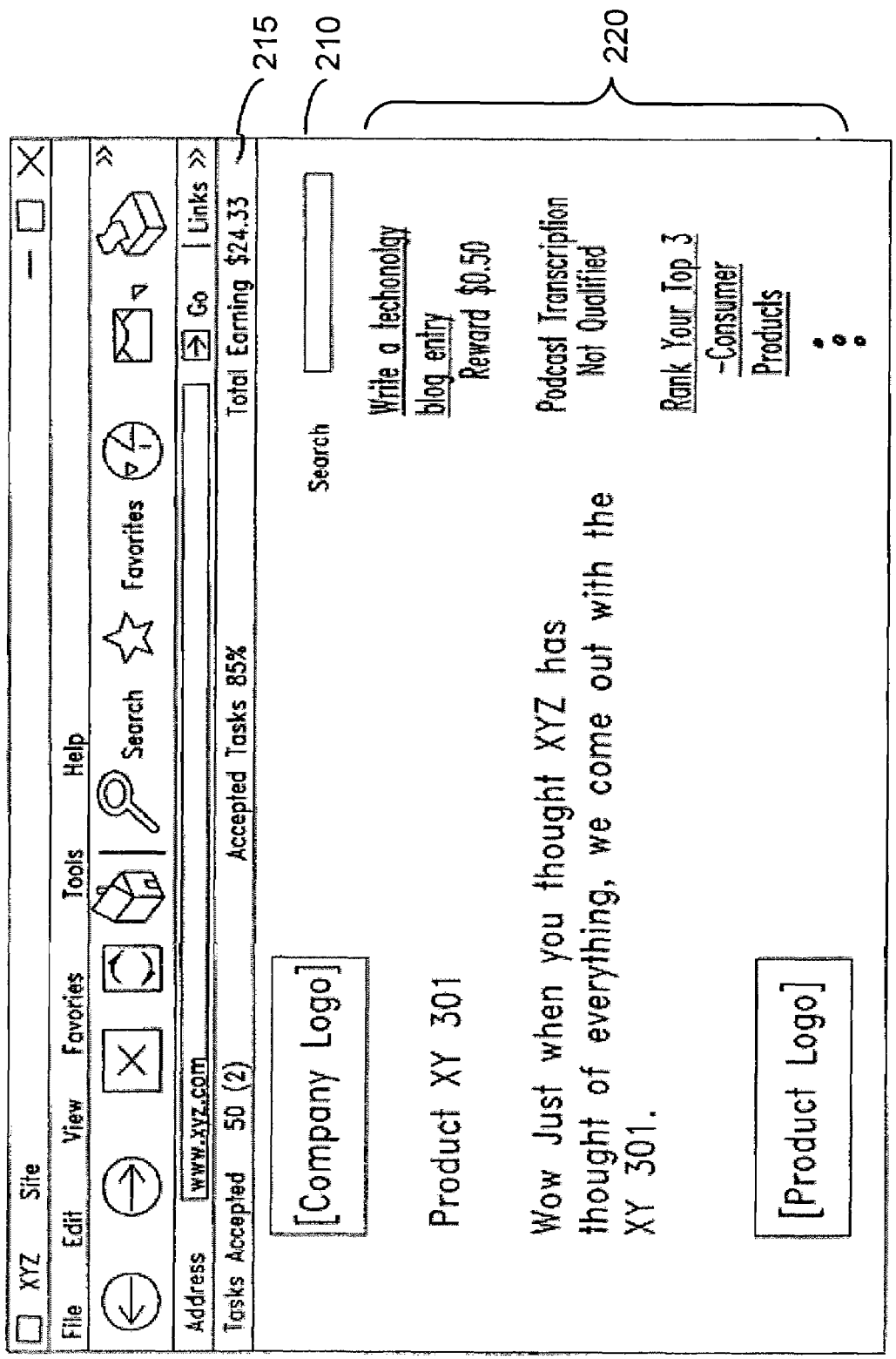

FIG. 2B illustrates a similar example Web page displayed in a Web browser user interface 210, but in this example the client computing device executing the Web browser has an installed client-side extension application that is executing.

In this illustrated example, the client-side extension application adds a client-side toolbar display 215 to the Web browser user interface, and causes a group of information about available tasks 220 to be visible to the user (not shown). The task information being displayed may be obtained in various ways, such as by inclusion in the Web page or other information sent by the third-party site, or by retrieval by the client-side extension application from the task exchange server. In addition, while not displayed here, in other embodiments additional instructional information may be presented to the user to explain what the task information is and/or how to perform the tasks. In this example, the toolbar 215 also presents various information about the prior performance of tasks by the current user as a task performer user (e.g., as retrieved from the task exchange server), including a percentage of tasks accepted, a number of tasks accepted and currently working on, and total rewards earned. Additional information may be displayed in other embodiments, such as qualifications, number of tasks submitted to the task exchange server, the number of results of task performance that have been approved by task requesters, etc., and one or more of various user-selectable controls may be included in the toolbar for use by the user in obtaining additional information and/or performing various types of functionality.

In this example, the information 220 about the group of available tasks includes information about three example available tasks being presented to the task performer user, those being to write a technology blog entry, to transcribe a podcast, and to rank top 3 consumer products. Various details about the tasks are illustrated in this example, such as an associated reward for successful performance and/or or an indication of this particular user not being qualified for one of the tasks (e.g., based on information that the client-side extension application has about the user). In other embodiments, more or less information about the tasks may be displayed to the task performer user. In some embodiments, icons may be used to indicate various details quickly to the task performer user, such as an icon indicating that the task performer user is not qualified for a task or that a reward for performing the task is a charitable donation to a specified charity. In addition, in some embodiments the Web page and/or toolbar may include one or more sections for the user to provide task performance results, such as a text-editable field for the user to type the blog entry or a list of top 3 consumer products, and with a user-selectable control in the Web page and/or toolbar for the user to submit such results.

In this example, when the user selects one of the displayed tasks, the user may be presented with additional details about the task and/or with a separate interface for performing the task, such as within the existing Web page, in a new Web page, in the displayed toolbar, etc. The additional information about the task may be obtained by, for example, interacting with the task exchange server, interacting with the third-party Internet site, and/or by using information that was previously obtained before the selection. In some embodiments, a task performer user may first accept a task before performing it (e.g., so that the task exchange server assigns the task to the task performer user, such as for a limited time, and does not allow other task performer users to perform the task instead of the task performer user while it is assigned), and if so the selection of the task may in some such embodiments be treated as such acceptance by the task performer user (e.g., if displayed information, not shown, indicates that selection is treated as acceptance), or may instead provide other information (e.g., a distinct Web page) to the user that allows the user to perform the acceptance before initiating performance. Since the task performer user is not qualified to perform the podcast transcription task in this example, the task is shown in this example in a manner that is not user-selectable; in other embodiments, the task performer user may not be shown available tasks for which the task performer user is not qualified, or the task may be selectable for use in a way other than performing the task (e.g., to obtain additional information about the task, to attempt to obtain one or more qualifications for performing the task, etc.).

Figure 2C:
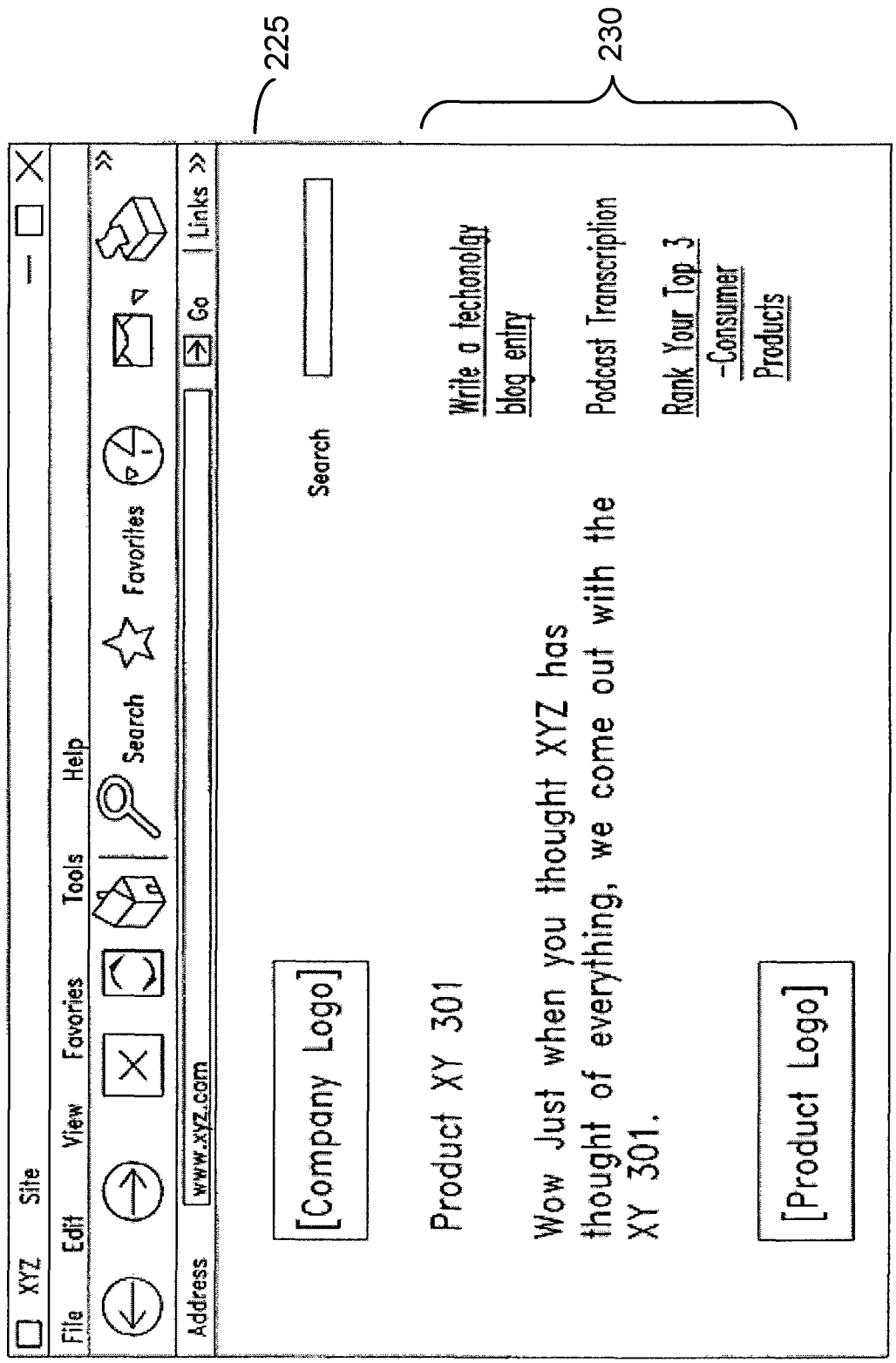

FIG. 2C provides another example that is similar to FIG. 2B, but is this example the task information is visible without the use of a client-side extension application, such as when the information about the available tasks is inserted into the Web page by the third-party Internet site. In particular, the Web browser user interface 225 includes a Web page that has information 230 about a group of available tasks. In this example, the third-party Internet site does not have at least some relevant information about the user (e.g., whether the user is a task performer user or not, qualifications of the task performer user even if the user is known to be a task performer user, geographical location, etc.), and thus various tasks may be displayed that may not be available to be performed by the user. For example, since the podcast transcription in this example requires one or more qualifications and it is not known if the user is qualified, the podcast transcription task is shown as not being user-selectable; however, if the user is interested (and is in fact qualified), the user may separately go to the task exchange server to accept and perform the task. Alternatively, the task may be shown as user-selectable, but may direct the user to the task exchange server site for similar actions by the user.

In addition, while not shown here, in some embodiments information and a corresponding link or other user-selectable control may be provided to allow the user to sign-up as a task performer user. Such information may be useful to encourage users of third-party Internet sites with specialized qualifications or interests to become task performer users. For example, by distributing tasks about French-English translation on sites about French culture, visitors of the Internet site that are not already task performer users may sign up to perform tasks.

Figure 2D:
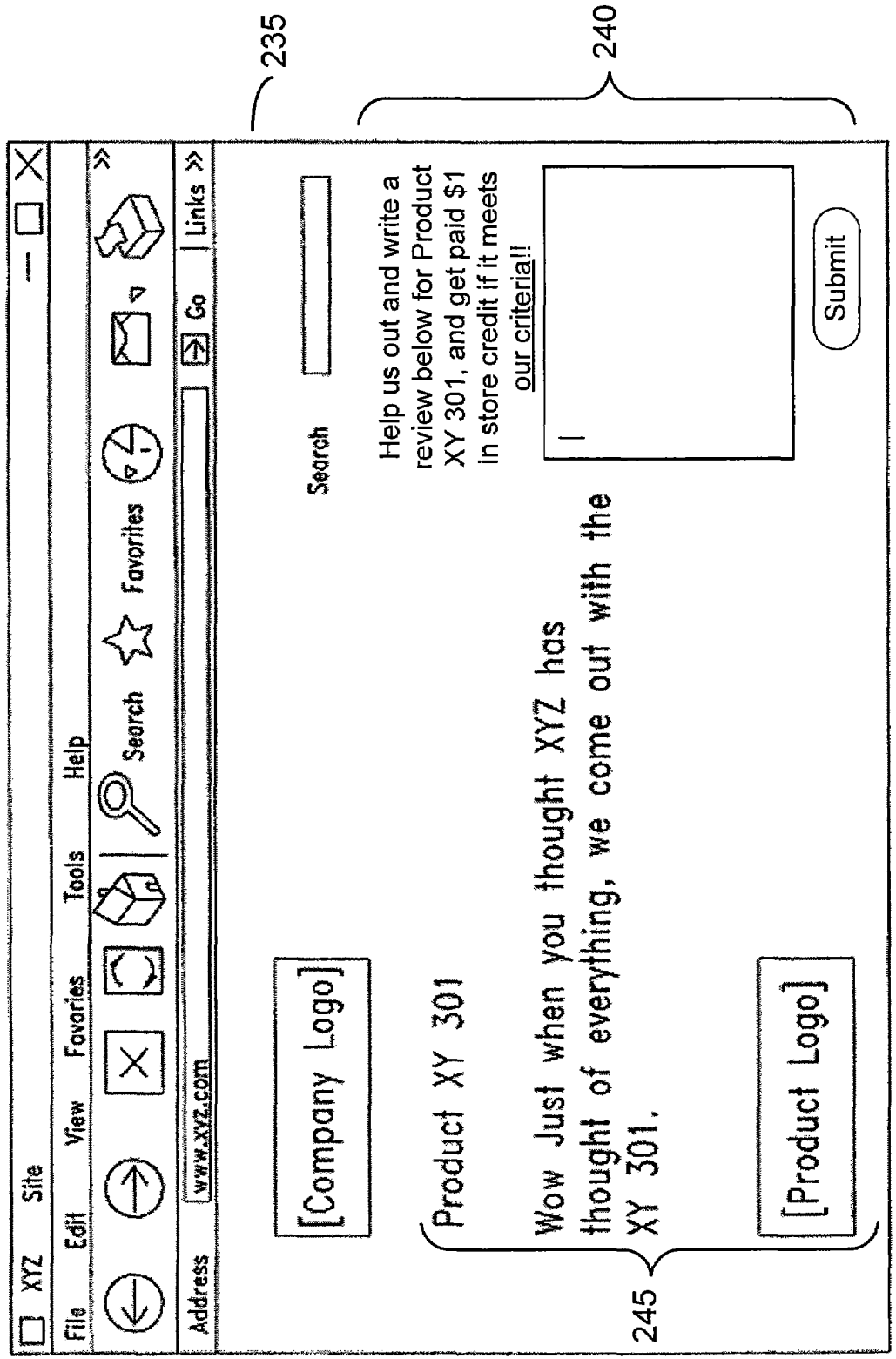

FIG. 2D provides another example that is similar to those of FIGS. 2B and 2C, but is this example the task that is displayed is selected based on being related to the other information displayed by the third-party Internet site. In particular, the example Web browser user interface 235 of FIG. 2D includes a Web page that has various information 245 about a particular product (e.g., a product provided by the company that operates the third-party Internet site), as well as various information about a corresponding available task 240 that has been added to the user interface. In this example, the related task is for the user to write a product review for the product described in the information 245 (such as for a task submitted by the operator of the third-party Internet site, or instead by another party), although in other embodiments related tasks may have other forms (e.g., provide information about products similar to the particular displayed product, provide information or use skills that would be available to an experienced user of the particular displayed product or similar products, etc.). The task information 240 in this example includes instructions that include an indication of available compensation to the user for performing the task (in this case, store credit for the company operating the third-party Internet site, such as if that company if the task requester who submitted the task), a text-editable field for the user to input the review, and a user-selectable "Submit" control for the user to submit his/her results of writing the product review. While only one task has been shown in this example, multiple tasks may be displayed in other embodiments, with some or all of the multiple tasks being related to the corresponding content of the other information being displayed. The selection of the one or more related tasks to include for a particular group of information provided by a third-party site may be made in various ways in various embodiments, such as by the third-party site itself (e.g., by selecting from its own tasks, by searching through possible available tasks made available from others, etc.), by the task exchange server (e.g., if the third-party site requests task information and includes information about the other information to be displayed or otherwise provided), or by a client-side extension application of the user (by similarly contacting the task exchange server to request task information related to the other information provided by the third-party site, or by searching through information about possible available tasks).

While various specific details are provided in FIGS. 2B-2D regarding examples of user interfaces and interactions related to performing tasks, it will be appreciated that a variety of other types of information and functionality may be provided in a variety of other ways in other embodiments.

In addition, the information that is supplied about available tasks, whether initially or after selection by the user, may take various forms in various embodiments. For example, in some embodiments, the task information may be supplied as text, HTML code snippets, or RSS ("Really Simple Syndication") feeds. Alternatively, in some embodiments the task information may be supplied in a manner to be inaccessible to third-party Internet site, such as information that is retrieved by the client devices of the users (whether as initiated by the client-side extension application or by information provided by the third-party site), or as information that is provided to the third-party site in a form that is difficult to analyze, such as images, in an encrypted form (e.g., that may be decrypted by the client-side extension application), as client-side code (e.g., JavaScript), as Flash animations, as audio files, as one or more XML elements to be interpreted by the client-side extension application, etc. The provided task information may include some or all of the details about the task that are available to the task exchange server. For example, the initial task information supplied to the third-party Internet sites and/or the client-side extension application may be limited to a small description and a reference to the task (e.g., a URL and/or a unique task identifier corresponding to the task exchange server or the third-party Internet site).

If complete task information is not initially provided, various additional information to perform the tasks may be supplied (e.g., information to be analyzed, such as pictures to classify or text to translate, detailed instructions related to performance of the task and/or supplying of task performance results, etc.) in various ways, whether directly by the task exchange server or via the third-party Internet sites. Moreover, as previously noted, the task performer user may in some embodiments perform some or all of the available tasks via interactions with the third-party Internet sites (e.g., by supplying results via user-editable fields in a Web page served by a third-party Internet, while in other embodiments access to the results by the third-party site may be blocked in various ways (e.g., by sending results directly to the task exchange server, by redirecting the task performer user to the task exchange server to interactively supply the task results, by encrypting the results in a manner accessible by the task exchange server, etc.). In addition, the task exchange server may provide various APIs to enable interactions with the third-party Internet sites, client-side extension applications, computing systems of task requesters, etc.

As previously noted, in at least some embodiments the task exchange server acts as an intermediary to allow task requesters to request (e.g., via programmatic invocations of one or more APIs of the task exchange server by application programs of the task requesters or interactively requesting that tasks be performed via a Web site) that tasks be performed by human task performer users and to receive corresponding results after the tasks are performed (e.g., as responses to the requested tasks). In some embodiments, human task performer users may also access the task exchange server (e.g., in a programmatic or interactive manner) to obtain information about available tasks that they can perform and to provide the results of task performance after the completion of tasks that they are assigned. By enabling large numbers of unaffiliated or otherwise unrelated task requesters and task performer users to interact via the intermediary task exchange server in this manner, free-market mechanisms mediated by the Internet or other public computer networks can be used to programmatically harness the collective intelligence of an ensemble of unrelated human task performer users.

The types of tasks that may be submitted and performed may also vary in various embodiments, and in some embodiments only certain types of tasks submitted to the task exchange server may be distributed via the third-party sites (e.g., types of tasks whose results are amenable to be provided by users via interactions with the third-party sites and/or client-side extension applications). In particular, in some embodiments some or all of the tasks are cognitive human performance tasks that use cognitive and/or other mental skills of human task performer users, such as to use human judgment capabilities to form an opinion related to one or more subjective bases, to use human discernment and/or perception skills to select information (e.g., by analyzing audio and/or video information, such as to perform pattern recognition), to use human reasoning skills (e.g., based on common-sense reasoning), etc. More generally, in at least some embodiments the tasks to be performed are human performance tasks that are selected based on their susceptibility to performance by humans, whether because automated systems are not currently capable of performing the tasks or because human task performer users can perform the tasks more cheaply, rapidly, and/or accurately than other alternatives. For example, while automated text translation tools may translate text between languages at a limited level of proficiency, human translators with appropriate qualifications may be able to perform the translations with a significantly higher proficiency level. In addition, in some embodiments some or all of the tasks include questions to be answered by the task performer users, such as to select from an enumerated set of potential answers or to more generally generate an appropriate answer. Furthermore, while in some embodiments each of the tasks may be a cognitive human performance task that uses cognitive and/or other mental capabilities of human task performer users, in other embodiments some or all of the tasks may include physical activities by one or more human task performer users (e.g., to take and supply a specified type of picture, such as at a specified geographic location), whether instead of or in addition to one or more cognitive or other mental activities of one or more human task performer users. The results of task performance can also take various forms in various embodiments, including answers to questions, a selection by a task performer user of one or more options provided as part of the task, a manipulated form of information provided to the task performer user, a categorization or other analysis of information provided to the task performer user, etc.

The task exchange server may in at least some embodiments further perform a variety of additional activities to facilitate the performance of tasks. For example, the task exchange server may track the progression of the tasks through various states (e.g., an "open" state for tasks that are available to be performed, an "assigned" state for each assignment of a task to one or more task performer users, a "completed" state for an assignment after the task performer user provides the results of performance of the task, etc.), and may further take various actions corresponding to the tasks. In addition, in some embodiments a task requester user may impose various criteria regarding performance of a task (e.g., required and/or preferred qualifications for task performer users, time limits for task completion, etc.) and/or may specify various actions associated with task performance (e.g., payment of a specified fee under specified conditions), and if so the task exchange server may enforce those criteria and initiate those actions as appropriate for the task.

In some embodiments, the task exchange server further provides a variety of types of functionality related to obtaining and using information about qualifications and other attributes of task performer users and/or task requester users, such as to allow users to identify and/or specify types of users with whom to conduct transactions. For example, the task exchange server may track various information about activities by task performer users and/or task requester users in some embodiments, such as to automatically generate quantitative measurements of actions taken by the users that may be used as qualifications (e.g., activities related to prior task performance). More generally, in some embodiments the task exchange server may support user qualifications of various types (e.g., qualifications for a user that are asserted by that user, that are specified by one or more other users, and/or that are automatically generated by the task exchange server).

Interactions between the task exchange server and users of the task exchange server may occur in a variety of ways in addition to the interactions related to the third-party sites. As previously noted, in some embodiments task requesters interact with the task exchange server in a programmatic manner, such as by invoking defined APIs of the marketplace (e.g., APIs based on Web services provided by the task exchange server) to send messages that request or supply information. The defined APIs may allow the task requesters to not only submit tasks that are available to be performed, but also to perform various other actions with respect to previously submitted tasks (e.g., check on the status of pending tasks, modify information about pending tasks, submit instructions regarding handling of pending tasks, and interactively obtain results for completed tasks). In addition, the defined APIs may allow task requesters to further perform various other types of interactions with the task exchange server, such as searching for and/or browsing for information of interest (e.g., to identify available task performer users having specified qualifications or attributes, or to identify information about tasks submitted by other task requesters), supplying qualification information for themselves and/or for task performer users, etc. In addition, in some embodiments at least some communications may occur directly between a task requester and a task performer user (e.g., to allow a task performer user to obtain information from a task requester regarding a task to be performed, to allow a task performer user to provide task results information to a task requester for a task that has been performed, etc.), or more generally between any two or more users, such as after the task exchange server facilitates that direct communication (e.g., by providing appropriate contact or other communication-related information to at least one of the parties to the communication).

In at least some embodiments, the task exchange server may also provide an interactive console that allows task requesters to interactively perform some or all of the various types of actions previously noted, whether instead of or in addition to a programmatic interface that is provided for those actions. For example, in some embodiments the interactive console functionality may be accessed by a task requester user via a Web browser that interacts with a Web server for the task exchange server (e.g., by supplying appropriate information in a form on a Web page from the electronic marketplace).

In a similar manner, task performer users may interact with the task exchange server in a variety of ways in order to identify available tasks of interest and to perform such tasks, whether in a programmatic and/or interactive manner. More generally, task performer users may similarly perform a variety of types of actions with respect to the task exchange server, including searching for and/or browsing for available tasks for which they are qualified, searching for and/or browsing for tasks from task requesters who have specified attributes, supplying qualification information, requesting assignments for available tasks of interest, supplying results from performance of tasks to which they have been assigned, requesting notifications of later-submitted tasks for which they are qualified, providing various types of preference information, etc.

In addition, the task exchange server may facilitate the exchange of payments between parties to transactions involving tasks, such as between task requesters and task performer users (e.g., to provide payments to the task performer users from the task requesters for satisfactory performance of submitted tasks), between the task exchange server and the third-party sites (e.g., to provide payments for providing task information via the third-party's Web site), and/or between task requesters and the task exchange server (e.g., to provide any fees charged by the task exchange server). The task exchange server may include internal payment handling capabilities, such as via a payment handling system, or may instead interact with an external payment handling system to provide the payments.

Moreover, a variety of types of non-monetary compensation (e.g., for performance of tasks) and other non-monetary rewards may also be used in other embodiments, whether provided by task requesters (e.g., for performance of submitted tasks), task performer users (e.g., for the opportunity to perform tasks), the task exchange server (e.g., for specified types of user activities), and/or third parties to transactions related to task performance. In particular, in some embodiments compensation to one or more task performer users or other parties may include credit and/or discounts for use at one or more online retailers (e.g., a Web merchant affiliated with the task exchange server), such as to allow those task performer users to purchase and/or rent goods and services for themselves and/or for others as gifts. In addition, in some embodiments such compensation and/or information about such compensation (e.g., a promise to provide such compensation at a future time when specified conditions are satisfied) may also be provided immediately or substantially immediately to a task performer or other recipient of the compensation, such as to allow the recipient to immediately use the compensation for a retail transaction at an item marketplace associated with the task exchange server. In other situations, a reward for performance of a task may include recognition of the task performer (e.g., by display information about specified activities of the task performer and/or a ranking of the task performer relative to other task performers), such as a task performed for a task requester that is a charity or that otherwise benefits a charitable cause or other beneficial entity or activity.

Task performer users may also specify various actions related to tasks in at least some embodiments, such as to request that information about available tasks and/or about other users be provided in various ways (e.g., to be notified when specified types of tasks become available, to indicate various task-related preferences, etc.), and if so the task exchange server may similarly initiate those actions as appropriate. More generally, the task exchange server may select appropriate tasks for a task performer user in various ways, including based on any such task performer user specifications, such as to provide information about those tasks to that task performer user via a Web site of the task exchange server, via a client-side extension application of the task performer user, via third-party sites providing information to the task performer user, by sending electronic communications to other computing or communication devices of the task performer user, etc. Additional details related to identifying tasks for task performer users are included in commonly-owned U.S. patent application Ser. No. 11/537,508, filed concurrently and entitled "Identifying Tasks For Task Performers Based On Task Subscriptions," and in commonly-owned U.S. patent application Ser. No. 11/537,508, filed concurrently and entitled "Automatically Generating Task Recommendations For Human Task Performers," each of which is hereby incorporated by reference in its entirety. Additional details related to providing information to a task performer user about available tasks are included in commonly-owned U.S. patent application Ser. No. 11/537,494, filed concurrently and entitled "Facilitating Performance Of Submitted Tasks By Mobile Task Performer Users," which is hereby incorporated by reference in its entirety.

Figure 3:
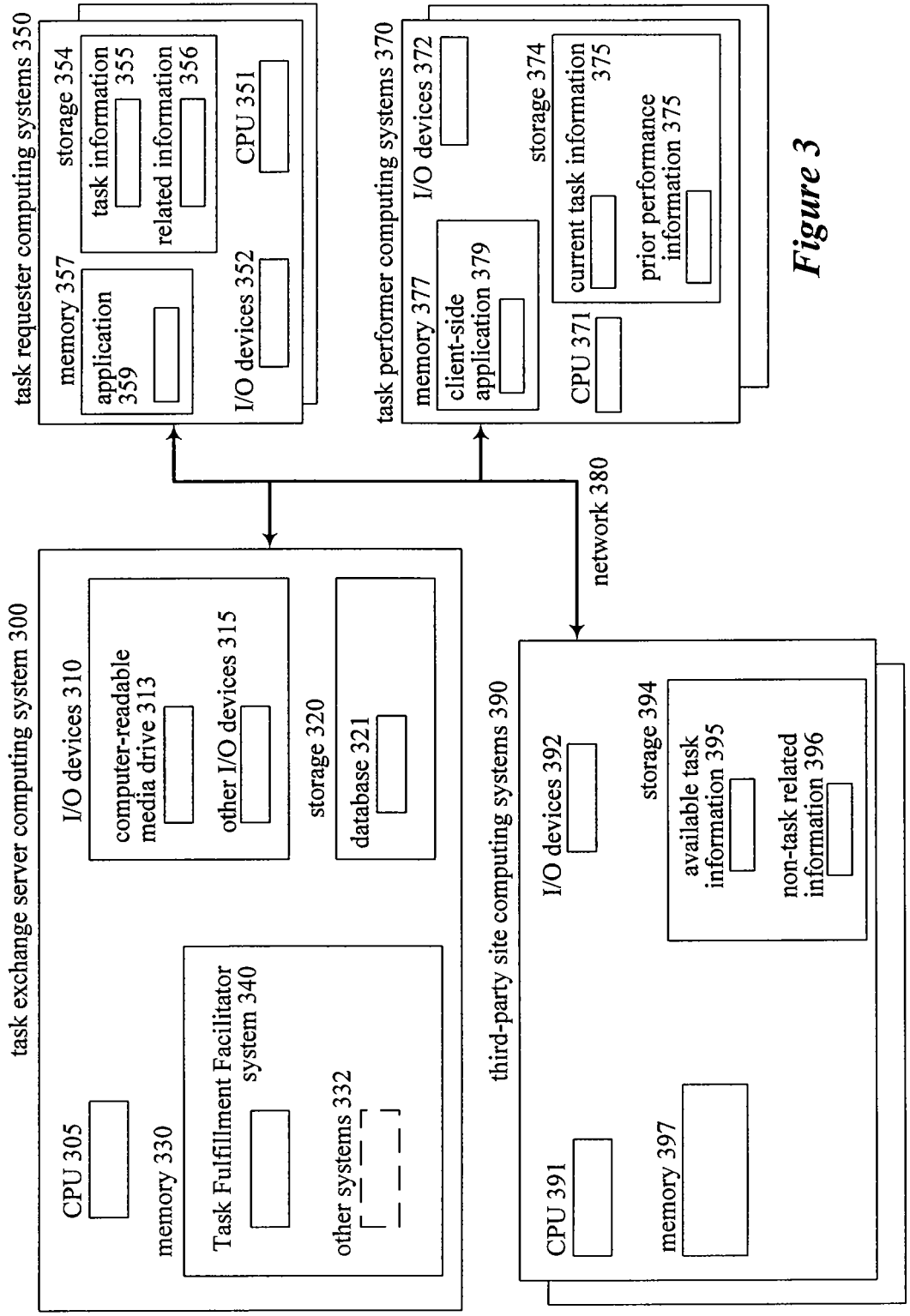
FIG. 3 is a block diagram illustrating a computing system suitable for executing an embodiment of a system for distributing available tasks

FIG. 3 illustrates a task exchange server computing system 300 suitable for executing an embodiment of the task exchange server, as well as various task requester computing systems 350, task performer user client computing systems 370, and third-party server computing systems 390. In the illustrated embodiment, the task exchange server computing system 300 includes a CPU 305, various I/O ("input/output") components 310, storage 320, and memory 330. The I/O components include a computer-readable media drive 313 and other I/O devices 315 (e.g., a display, mouse, keyboard, network connection, etc.).

An embodiment of a task exchange server is executing in memory, which in this example embodiment is a Task Fulfillment Facilitator ("TFF") system 340, and it interacts with the other computing systems over the network 380 (e.g., via the Internet and/or the World Wide Web). In particular, users of task requester computing systems 350 may interact with the TFF system in order to provide information about available tasks to be performed, such as by using an application program 359 (e.g., a Web browser or an application program invoking the API of the TFF system) executing in memory 357 to send stored task information 355 (e.g., information about the task, any associated criteria, any reward for successful performance, etc.) and related information 356 (e.g., information to be analyzed by human task performer users as part of the tasks) on storage 354. Human task performer users similarly use task performer user client computing systems 370 to interact with the TFF system, such as via a client-side extension application 379 (e.g., a toolbar application as part of a Web browser) in memory 377 that is executing in conjunction with a Web browser or other host application (not shown). The client-side extension application may, for example, obtain information about available tasks, provide results information for performed tasks to the TFF system, and obtain information related to the prior performance of tasks. When information is received at the computing system 370 about available tasks, whether as initiated by the client-side extension application or when sent by the TFF system or one of the third-party systems 390, the information is stored in this example embodiment with current task information 375 in storage 374 (e.g., temporarily until performance of the task is completed, or until the task is declined by the task performer user). Similarly, information about prior performance information 375 by the user may also be stored in storage 374.

Third-party server computing systems 390 may interact with the TFF system to obtain information related to available tasks, as well as to in some embodiments perform other operations (e.g., to receive rewards for placing available tasks on the third-party's Web site or other information service, to provide results when results are entered on the third-party Web site or other information service by users, etc.). When information is received about available tasks, the information is stored in available task information 395 in storage 395. Non-task information that the third-party server computing systems may provide to users, such as via a Web site provided by the third-party server computing system, may be stored in non-task related information 396 in storage 394.

The TFF system and its modules (not shown) may also access and use various task-related and user-related information on storage 320 or elsewhere, such as information stored in one or more databases 321. Such modules may include, for example, a module for interacting with task requesters, a module for directly interacting with task performer users (e.g., via a Web site provided by the TFF system), a module for interacting with task performer users via client-side extension applications executing on their devices and/or a module for facilitating task performance by task performer users via interactions with third-party sites interacting with the task performer users, etc. In addition, in some embodiments the TFF system may also interact with other optional systems 332 executing in memory 330 and/or on other optional computing systems to perform additional related functionality, such as to perform payment processing in order to provide payments to human task performer users on behalf of task requesters.

Those skilled in the art will appreciate that computing systems 300, 350, 370 and 390 are merely illustrative and are not intended to limit the scope of the present invention. The TFF system or other task exchange server may instead be executed by multiple interacting computing systems or devices, and computing system 300 may be connected to other devices that are not illustrated, including through one or more networks such as the Internet, via the World Wide Web ("Web"), or via private mobile communication networks. More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the various TFF system modules may in some embodiments be combined in fewer modules or distributed in additional modules. Similarly, in some embodiments the functionality of some of the modules may not be provided as part of the TFF system and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules may execute in memory on another device and communicate with the illustrated computing system via inter-computer communication. Some or all of the system modules and/or data structures may also be stored (e.g., as software instructions or structured data) on a computer-readable medium, such as a hard disk, a memory, a network, or a portable media article to be read by an appropriate drive or via an appropriate connection. The system modules and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
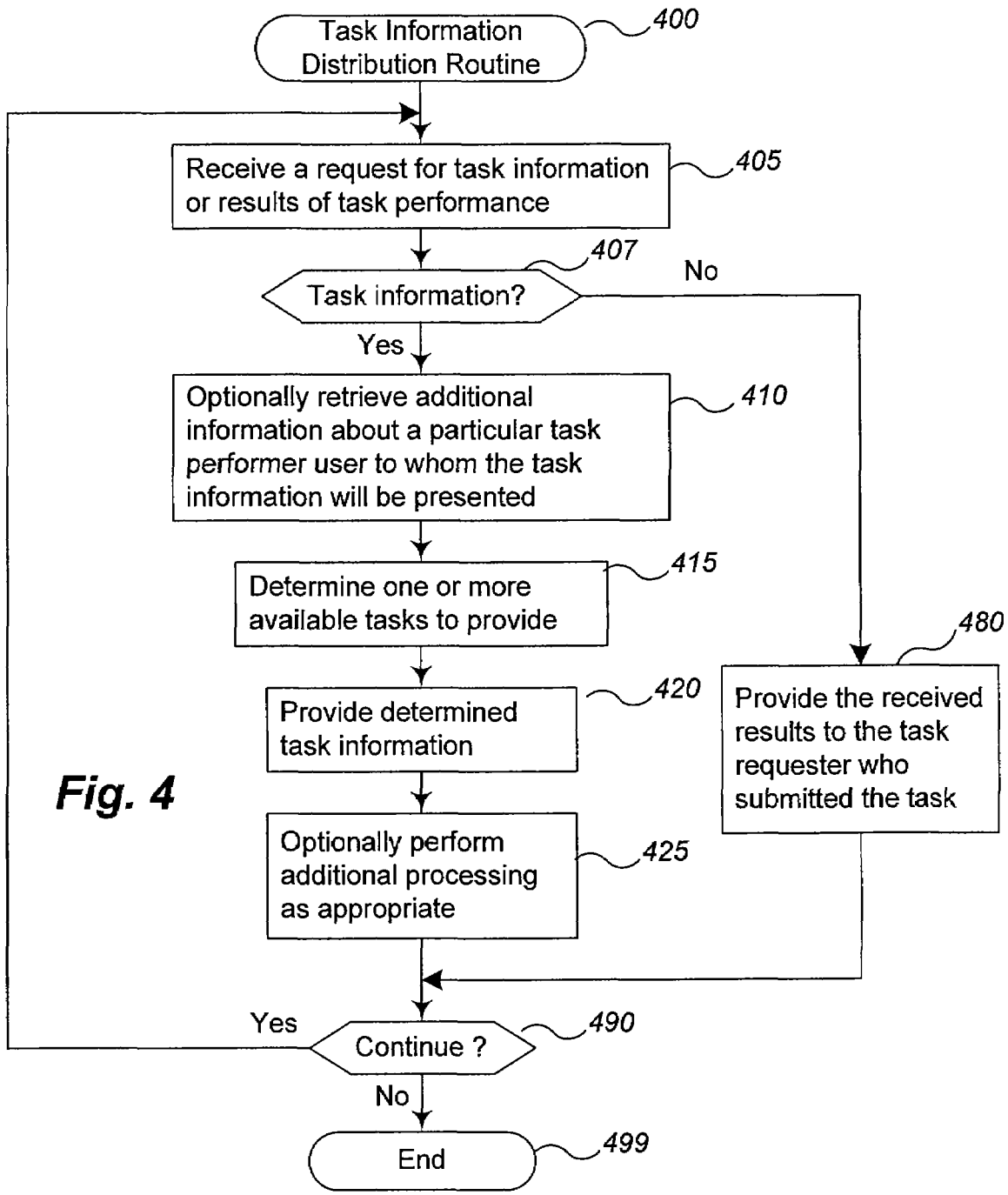
FIG. 4 is a flow diagram of an example embodiment of a Task Information Distribution routine.

FIG. 4 is a flow diagram of an example embodiment of a Task Information Distribution routine 400. The routine may, for example, be provided as part of a task exchange server, such as the task exchange server 115 of FIG. 1 or the TFF system 340 of FIG. 3. The routine interacts with third-party Internet sites and client-side extension applications to provide information about tasks to be provided to task performer users, as well as to perform other types of interactions.

The routine begins at step 405, where the routine receives a request or information from a third-party site or a client-side extension application of a task performer user. In this example, the received requests are for task information, whether for one or more task performer users (such as a request from a third-party site for information to provide to various task performer users), and the received information is results of performance of one or more tasks whose information was previously provided. In other embodiments, various other types of requests and information may be received, such as requests for various account and other information about a particular task performer user (e.g., from a client-side extension application executing on a computing device of that task performer user), information about preferences and other information specified by a task performer user (e.g., from a client-side extension application executing on a computing device of that task performer user), etc. The routine then continues to step 407 to determine whether a request for task information was received. If not, the routine continues to step 480 to process the received task performance results in one or more of various ways, such as to store the results for later use, to analyze the results to determine if they are appropriate, to provide the results to the task requester(s) for the task(s) to which they correspond (e.g., if the results are appropriate), to provide payment to the task performer user(s) who performed the task(s) (e.g., if the results are appropriate), etc.

If it is instead determined in step 407 that a request was received for task information, the routine proceeds to step 410 where, if information about a particular task performer user was received in step 405, the routine optionally retrieves additional information about the task performer user for use in determining appropriate tasks for the task performer user (e.g., information about task performer user qualifications, preferences, subscriptions to information about types of tasks, etc.). The routine then proceeds to step 415, where the routine determines one or more available tasks whose information is to be provided in response to the received request. As discussed in greater detail elsewhere, the determination that a particular task is appropriate may be based on one or more of a number of factors including, but not limited to, the number of tasks requested, the length of time left for the task to be performed, preferences of the task requester that submitted the task, the qualifications for the task, a type of the task, other information to be presented with the available task, the length of time to complete the task, the amount of any reward, preferences of the task exchange server regarding having the task be performed, preferences of a third-party site (if any) that is requesting the information, the geographical location of the identified task performer user (if any), preferences of the task performer user, qualifications of the task performer user, other task performance capabilities of the task performer user, etc. Once the routine has determined one or more tasks to provide, the routine continues to step 420, where the routine provides information about the determined tasks to the third-party site or client-side extension application from whom the request was received in step 405. The provided information may take a variety of forms, as previously discussed, including some or all of the details about the task, an indication of the task along with a URL or other reference for use by a task performer user in obtaining additional information about the task from the task exchange server, etc. The routine may then subsequently perform additional processing as appropriate in step 425. For example, the routine may store information about which tasks were distributed to which sites, alter the display of the available tasks at the task exchange server (e.g., to remove the listing of the task, such as if it is temporarily reserved for performance by a task performer user who receives the provided task information), indicate to the task requester that the task has been distributed, etc. After steps 425 or 480, the routine then proceeds to step 495 to determine whether to continue. If so, the routine continues to step 405 and if not, ends at step 499.

Related functionality may be provided in other manners in other embodiments. For example, in some embodiments, a similar routine may run in batch mode so as to send out information about available tasks to each of multiple third-party sites, such as on a periodic basis.

Figure 5:
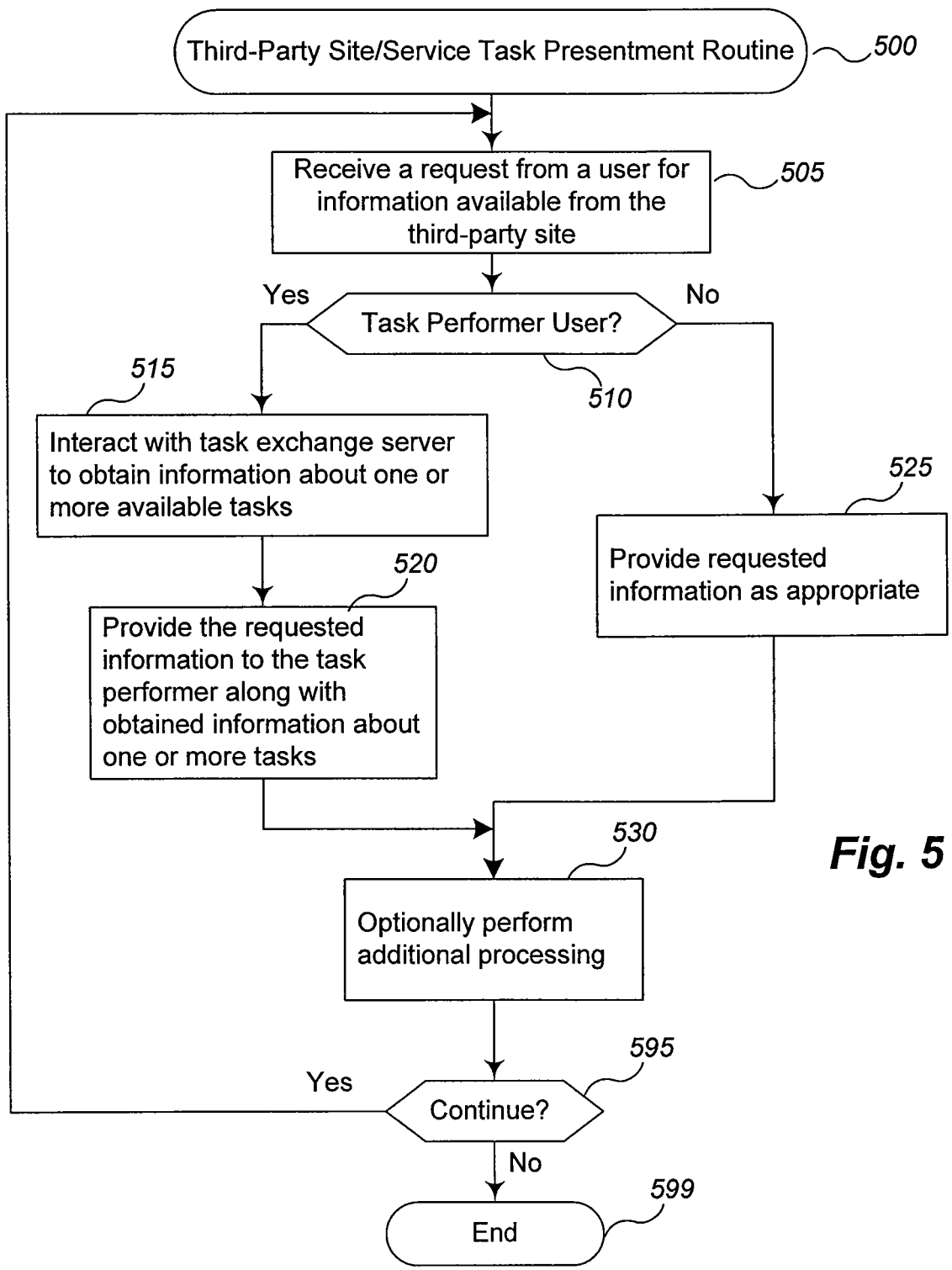
FIG. 5 is a flow diagram of an example embodiment of a Third-Party Site Task Presentment routine.

FIG. 5 is a flow diagram of an example embodiment of a Third-Party Site Task Presentment routine 500. The routine may, for example, be provided as part of operation of a third-party site, such as third-party Internet site or other information service 105 of FIG. 1 (e.g., by a Web server providing the site, or other server providing the information for the service). The routine obtains information about tasks from the task exchange server and provides task information to at least some users along with other information available from the site.

The routine begins at step 505, where a request is received from a user for information accessible from the third-party site. At step 510, the routine then determines if the user is a task performer user, and proceeds to step 515 if so, and to step 525 if not. In the illustrated embodiment of the routine, the routine provides task information only to users identified as being task performer users, although in other embodiments the routine may operate in other manners (e.g., always provide task information, whether in a manner to be visible by default or instead for use by a client-side extension application if one is present and in use by the user to whom the information is provided). The routine may determine if the user is a task performer user in various ways, such as by querying the user during registration at the third-party site (if a login is needed), based on information previously received from the user or the task exchange server, by dynamically interacting with the task exchange server based on available information about the user, etc. In the illustrated embodiment, if the user is not a task performer user, then the routine provides the requested information from the third-party site to the user in step 525. Alternatively, if the user is a task performer user, the illustrated routine interacts with the task exchange server in step 515 to obtain information about available tasks, such as tasks for the user from whom the request was received in step 505. In other embodiments, the routine may instead retrieve information about available tasks that was previously supplied by the task exchange server. After interacting with the task exchange server, the routine in step 520 provides the requested information from the third-party site and the obtained task information to the user from whom the request was received in step 505.

After steps 520 or 525, the routine then proceeds to step 530, where the routine optionally performs additional processing, such as receiving results from the user for some or all of the available tasks whose information is provided and forwarding such results to the task exchange server, receiving indications that the task performer user has accepted the task and forwarding the indications to the task exchange server, logging the tasks supplied, etc. The routine then proceeds to step 595 to determine whether to continue. If so, the routine returns to step 505, and if not ends at step 599.

Figure 6:
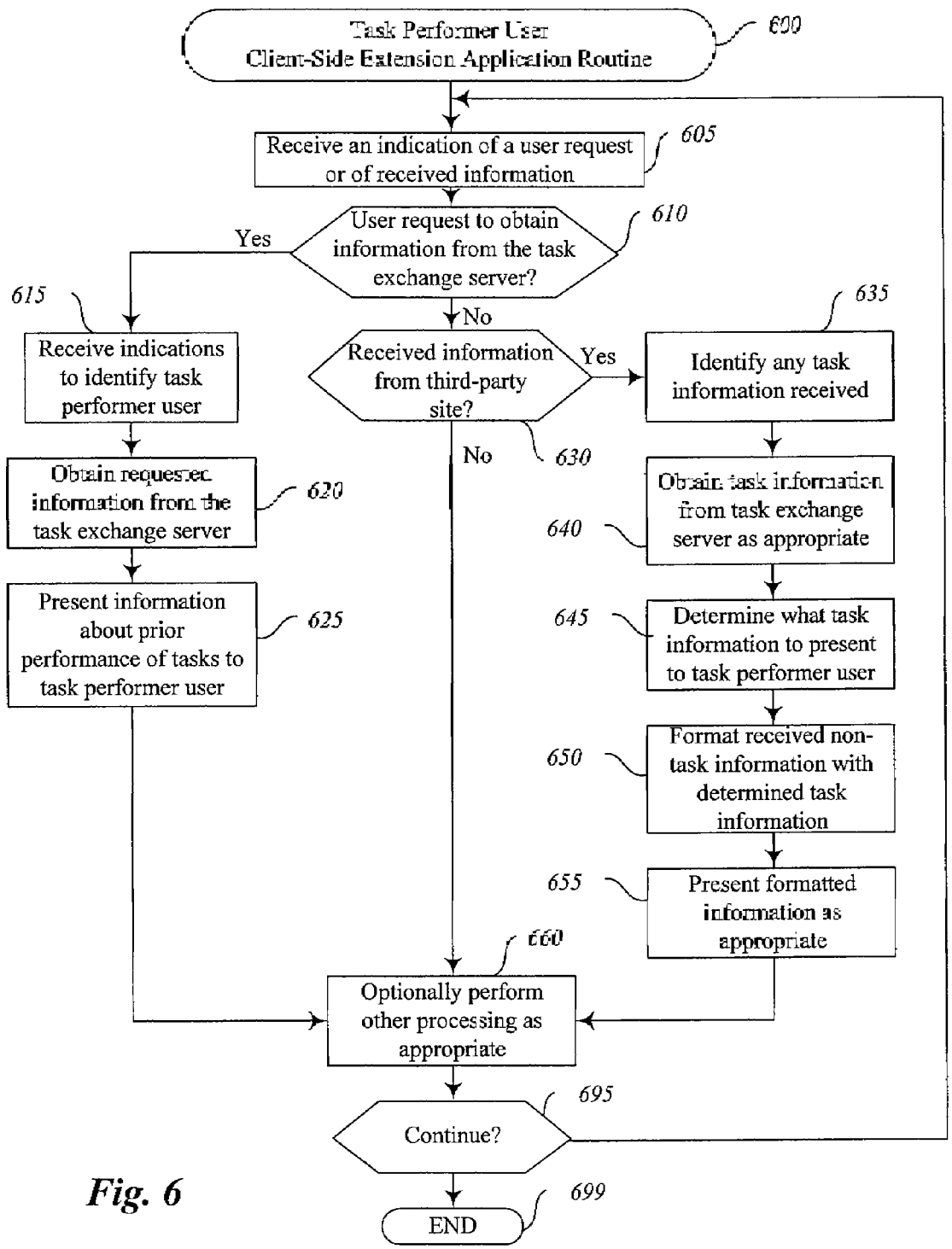
FIG. 6 is a flow diagram of an example embodiment of a client-side extension application routine.

FIG. 6 is a flow diagram of an example embodiment of a client-side execution application routine 600. The routine may, for example, be provided by execution of the client-side extension application 379 of FIG. 3, such as to facilitate providing information about tasks to a task performer user, as well as to optionally perform other interactions with the task exchange server on behalf of the task performer user.

The routine begins at step 605, where an indication is received of a request from a user or of information to be displayed. While not illustrated here, the routine may also occasionally interact with the task exchange server, such as to obtain and maintain information about available tasks and/or to update information about the user's interactions with the task exchange server. In step 610, the routine determines if the request was from a user to obtain information from the task exchange server, such as information about the user's prior interactions with the task exchange server. If so, the routine proceeds to step 615, and if not, proceeds to step 630. At step 615, the routine identifies the task performer user, such as information previously or currently provided by the task performer user. The routine then proceeds to step 620 to obtain the requested types of information from the task exchange server. In step 625, the routine then presents the obtained information to the task performer user, such as via a toolbar or other user interface area controlled by the client-side extension application. After presenting the information, the routine proceeds to step 660.

If it was instead determined in step 610 that the received indication was not a request from the user, the routine determines in step 630 whether information has been received from a third-party site. If so, the routine continues to step 635, and if not proceeds to step 660. In step 635, the routine identifies any task information received from the third-party site. After identifying any task information received, the routine continues to step 640, where information about tasks may optionally be obtained from the task exchange server, such as if no task information was received from the third-party site, or to obtain additional task information. In some embodiments, the client-side application may provide various parameters to the task exchange server to acquire particular tasks, such as based on the received information from the third-party site, preferences or other information about the task performer user, etc. In other embodiments, information about tasks that was previously obtained from the task exchange server is instead retrieved. After obtaining the information as appropriate, the routine continues to step 645 to optionally determine what, if any, task information to present to the task performer user (e.g., based on preferences of the task performer user, qualifications of the task performer user, based on the non-task information to be presented with the task information, etc.). In some embodiments, the routine will present all task information received from the third-party site and/or all task information received from the task exchange server. In step 650, the routine then optionally modifies the non-task information received from the third-party site so as to include the determined task information, such as by reconfiguring a received Web page, although in other embodiments the task information may have been included in the received information from the third-party site and thus not modified (or modified only to remove information about tasks that are not selected to be presented to the user, or to change task information included in the received information from the third-party site so that it is visible to the user). At step 655, the routine then presents the information to the task performer user, such as by providing the information to or otherwise interacting with a Web browser. In other embodiments, the routine will instead make some or all of the determined task information available in other manners, such as via a toolbar or other user interface provided by the client-side extension application. After presenting the information, the routine proceeds to step 660.

At step 660, the routine may optionally perform additional processing. The additional processing may include, for example, maintaining information about available tasks (e.g., by contacting the task exchange server to obtain information about tasks), receiving results for some or all of the presented tasks, obtaining information about the user (e.g., preferences, identity information, etc.), etc. The routine then proceeds to step 695 to determine whether to continue. If so, the routine returns to step 605, and if not ends at step 699.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for a task exchange server to facilitate performance of tasks by task performers, the method comprising:
   receiving information at a task exchange server about tasks submitted by task requesters as being available for performance by human task performer users; and
   distributing, by one or more programmed computing systems of the task exchange server, information about at least some of the submitted tasks via one or more information services that are not provided by the task exchange server, wherein the one or more information services each provides a Web site accessible to users, the distributing including, for each of the one or more information services,
   receiving a request for task information that is to be presented along with other information to a task performer user interacting with the information service, at least some of the other information to be presented being provided by the information service;
   determining one or more available tasks based at least in part on the at least some other information being provided by the information service and on additional information specific to the task performer user from one or more previous interactions between the task exchange server and one or more client computing devices of the task performer user; and
   sending information about the determined one or more available tasks for presentation to the task performer user via the Web site provided by the information service and on a client computing device of the task performer user that is executing a client application to access the Web site, to enable the task performer user to perform at least one of the determined tasks.

2. The method of claim 1 wherein the task exchange server provides an Internet site to facilitate performance of tasks, and wherein the method further comprises facilitating performance of some of the submitted tasks based on interactions of task performer users with the task exchange server Internet site, the interacting including providing information about tasks to task performer users and receiving results of performance of tasks by task performer users.

3. The method of claim 2 wherein, for one of the one or more information services, the sending of information about the determined one or more available tasks for presentation to the task performer user service is performed such that those determined tasks are available for performance by the task performer user based on one or more interactions between the task performer user and the information service and without interactions of the task performer user with the task exchange server Internet site.

4. The method of claim 1 wherein, for each of at least one of the one or more information services, the sending of information about the determined one or more available tasks for presentation to the task performer user is performed such that those determined tasks are able to be performed by the task performer user via interactions of the task performer user with the information service.

5. The method of claim 1 wherein the client application executing on the client computing device is a Web browser.

6. The method of claim 1 wherein the one or more information services are operated by one or more entities unaffiliated with an operator of the task exchange server.

7. The method of claim 1 wherein the determining of the one or more available tasks for the request is performed in a manner based at least in part on previously specified preferences of the task performer user.

8. The method of claim 1 wherein the determining of the one or more available tasks for the request is further based on preferences of the information service, the one or more task requesters that submitted the one or more tasks, or information about how performance of the one or more tasks is to occur.

9. The method of claim 1 wherein, for each of at least one of the information services, the request for task information is received from the information service.

10. The method of claim 9 wherein at least one request received from at least one of the information services is made by that information service as part of preparing a group of information to be presented to a task performer user.

11. The method of claim 9 wherein at least one request received from at least one of the information services is made by that information service before receiving interactions from one or more task performer users in order to gather information about tasks for later use during those interactions.

12. The method of claim 1 wherein, for each of at least one of the information services, the request for task information to be presented along with other information to a task performer user is received from a client computing device of the task performer user to whom the task information is to be presented.

13. The method of claim 12 wherein at least one request received from a client computing device of a task performer user is initiated based on information provided by one of the information services to the client computing device.

14. The method of claim 12 wherein at least one request is received from a first client computing device of a task performer user and is initiated by a client application executing on the first client computing device.

15. The method of claim 14 wherein the client application executing on the first client computing device is provided to the first client computing device by the task exchange server.

16. The method of claim 14 wherein the client application executing on the first client computing device provides a toolbar within an executing Web browser, and wherein the information presented to the task performer user of the first client computing device is part of one or more Web pages displayed via the executing Web browser.

17. The method of claim 1 wherein the request received from at least one of the information services is based on invocation by the information service of a Web service provided by the task exchange server.

18. The method of claim 1 further comprising, for each of at least one of the determined tasks whose information is provided to a task performer user via one of the information services, receiving results of performance of the task by the task performer user and providing the received results to the task requester that submitted the task.

19. The method of claim 18 wherein, for each of at least one of the task performance results for a task whose information is provided to a task performer user via one of the information services, the task performance results are received via the one information service.

20. The method of claim 18 further comprising, for each of the at least one determined tasks whose information is provided to a task performer user via one of the information services, before the receiving of the results of the task performance by the task performer user, receiving an indication that the task performer user will perform the determined task and assigning the determined task to the task performer user such that the determined task is not available to other task performer users.

21. The method of claim 1 wherein the providing of information about determined tasks includes supplying the information as at least one of images containing descriptions of the determined tasks and Really Simple Syndication feeds.

22. A non-transitory computer-readable medium having stored contents that configure a computing system to provide an electronically accessible information service that facilitates performance of tasks by tasks performers, by performing a method comprising:

receiving a request from a task performer user for information available from a Web site that is provided by an electronically accessible information service and is accessible to users, the available information not including information about tasks available to be performed;

interacting, by the configured computing system, and with a remote task exchange server that acts as an intermediary to facilitate performance by task performer users of tasks available from task requesters, to obtain information about at least one available task selected from one or more tasks available at the task exchange server, wherein selecting of the at least one available task is based at least in part on the information available from the electronically accessible information service that is requested by the task performer user and on additional information specific to the task performer user from one or more previous interactions with one or more client devices of the task performer user; and responding to the request by sending information to a client computing device of the task performer user for presentation via a client application executing on the client computing device to access the Web site, the sent information including information about the selected at least one available task and the information available from the electronically accessible information service that is requested by the task performer user, to enable the task performer user to use the sent information to perform one or more of the selected at least one available tasks.

23. The computer-readable medium of claim 22 wherein the method further comprises receiving requests from one or more users who are not task performer users for the task exchange server, each of the requests being for information available from the electronically accessible information service, and responding to each of the requests from the one or more users by providing information retrieved from the electronically accessible information service without providing information about any available tasks.

24. The computer-readable medium of claim 23 wherein a user is not one of the task performer users for the task exchange server if the user has not registered with the task exchange server to perform tasks, and wherein the method further comprises determining that at least one of the one or more users is not a task performer user for the task exchange server by interacting with the task exchange server.

25. The computer-readable medium of claim 22 wherein the information provided to the task performer user about the at least one available tasks is in a form that allows the task performer user to generate and provide to the task exchange server results of performance of each of one or more of the at least one available tasks without the results being accessible to the computing system.

26. The computer-readable medium of claim 22 wherein the Web site of the electronically accessible information service is unaffiliated with the task exchange server other than regarding obtaining and using task information from the task exchange server, and wherein the information provided to the task performer user includes one or more Web pages sent to the client computing device of the task performer user.

27. The computer-readable medium of claim 22 wherein the information provided to the task performer user about the at least one available tasks includes one or more references to each of at least one of the one or more available tasks such that the task performer user may select a reference to a task to obtain additional information about the task from the task exchange server.

28. The computer-readable medium of claim 22 wherein the information provided to the task performer user about the at least one available tasks causes the client computing device of the task performer user to automatically obtain additional information about the at least one available tasks from the task exchange server.

29. The computer-readable medium of claim 22 wherein the selecting of the at least one available task is further based on the selected at least one available task being previously submitted by the electronically accessible information service for performance.

30. The computer-readable medium of claim 22 wherein the computer-readable medium is a memory of the configured computing system.

31. The computer-readable medium of claim 22 wherein the stored contents are instructions that, when executed, cause the configured computing system to perform the method.

* * * * *